United States Patent
Fukumori et al.

(10) Patent No.: US 9,693,575 B2
(45) Date of Patent: Jul. 4, 2017

(54) MANUFACTURING METHOD OF INSTANT RICE, INSTANT RICE OBTAINED BY THE MANUFACTURING METHOD OF INSTANT RICE, AND DEVICE USED IN THE MANUFACTURING METHOD OF INSTANT RICE

(71) Applicant: SATAKE CORPORATION, Chiyoda-ku, Tokyo (JP)

(72) Inventors: Takeshi Fukumori, Hiroshima (JP); Hideaki Matsushima, Hiroshima (JP); Keishi Wakabayashi, Hiroshima (JP)

(73) Assignee: Satake Corporation, Tokyo (JP)

( * ) Notice: Subject to any disclaimer, the term of this patent is extended or adjusted under 35 U.S.C. 154(b) by 0 days.

(21) Appl. No.: 14/765,337

(22) PCT Filed: Jan. 10, 2014

(86) PCT No.: PCT/JP2014/050342
§ 371 (c)(1),
(2) Date: Aug. 2, 2015

(87) PCT Pub. No.: WO2014/122948
PCT Pub. Date: Aug. 14, 2014

(65) Prior Publication Data
US 2016/0007638 A1    Jan. 14, 2016

(30) Foreign Application Priority Data
Feb. 6, 2013    (JP) .................................. 2013-021369

(51) Int. Cl.
*A23L 1/182*    (2006.01)
*A47J 27/04*    (2006.01)
(Continued)

(52) U.S. Cl.
CPC ............. *A23L 1/1823* (2013.01); *A23L 7/196* (2016.08); *A47J 27/026* (2013.01); *A47J 27/04* (2013.01);
(Continued)

(58) Field of Classification Search
CPC ....... A23L 1/1823; A23L 7/196; A23L 7/1965; A47J 27/026; A47J 27/04; A47J 27/0817
See application file for complete search history.

(56) References Cited

U.S. PATENT DOCUMENTS 3,189,462 A * 6/1965 Autrey ................... A23L 7/196
426/462
4,233,327 A 11/1980 Ando et al.
(Continued)

FOREIGN PATENT DOCUMENTS

ES    2367965 A1    11/2011
JP    S52-46298 B2    3/1976
(Continued)

OTHER PUBLICATIONS

Spanish Search Report for Application No. 201590079 dated Nov. 23, 2015.
(Continued)

*Primary Examiner* — Helen F Heggestad
(74) *Attorney, Agent, or Firm* — Joseph P. Farrar, Esq.

(57) ABSTRACT

The present invention aims to provide a manufacturing method of instant rice which may be restored to edible rice simply by adding hot water. The method includes a first pressurized-steaming step for steaming raw material rice under pressure while the raw material rice is being agitated, and forming a gelatinized layer on a surface of the raw material rice, a hydration step for hydrating the raw material rice having the gelatinized layer formed on the surface, a tempering step for making moisture content of the hydrated (Continued)

raw material rice uniform, a second pressurized-steaming step for steaming the hydrated raw material rice under pressure while the raw material rice is being agitated, and gelatinizing the raw material rice to a center, a dehydration step for dehydrating the raw material rice that is gelatinized to the center, and an expansion step for expanding the dehydrated raw material rice.

6 Claims, 4 Drawing Sheets

(51) Int. Cl.
    *A47J 27/08* (2006.01)
    *A47J 36/34* (2006.01)
    *A47J 37/04* (2006.01)
    *A47J 27/026* (2006.01)
    *A47J 27/086* (2006.01)
    *A47J 27/09* (2006.01)
    *A23L 7/196* (2016.01)

(52) U.S. Cl.
    CPC ......... *A47J 27/086* (2013.01); *A47J 27/0817* (2013.01); *A47J 27/09* (2013.01); *A47J 36/34* (2013.01); *A47J 37/042* (2013.01); *A23V 2002/00* (2013.01)

(56) References Cited

U.S. PATENT DOCUMENTS

2010/0323087 A1  12/2010  Fukumori et al.
2012/0201946 A1   8/2012  Fukumori et al.

FOREIGN PATENT DOCUMENTS

| JP | S60-083550 A | | 5/1985 |
|---|---|---|---|
| JP | 03108459 A | * | 5/1991 |
| JP | H03-258221 A | | 11/1991 |
| JP | H07-255392 A | | 10/1995 |
| JP | 2007-054469 A | | 3/2007 |
| JP | 3142166 U | | 5/2008 |
| JP | 2011-083196 A | | 4/2011 |
| JP | 2012-161251 A | | 8/2012 |
| JP | 2013-051889 A | | 3/2013 |

OTHER PUBLICATIONS

International Search Report and Written Opinion for Application No. PCT/JP2014/050342 dated Feb. 25, 2014.
Tabuchi, Michiyuki. "Technology of Convenience Rice Products", Journal for Starch and its Relatged Carbohydrates and Enzymes, 1993, 40(2), pp. 169-175.

* cited by examiner

MANUFACTURING METHOD OF INSTANT RICE, INSTANT RICE OBTAINED BY THE MANUFACTURING METHOD OF INSTANT RICE, AND DEVICE USED IN THE MANUFACTURING METHOD OF INSTANT RICE

TECHNICAL FIELD

The present invention relates to a manufacturing method of instant rice, instant rice obtained by the manufacturing method of instant rice, and a device used in the manufacturing method of instant rice.

BACKGROUND ART

Conventionally, as a type of rice that cooks quickly, instant rice is known. The instant rice may be restored to edible rice by a quick simple preparation, and is useful as preserved food for emergencies. The instant rice is also useful as daily food.

Patent document 1 discloses a manufacturing method of instant rice which does not need a drainage treatment facility and which is capable of achieving a fine product appearance. This manufacturing method does not need a drainage treatment facility because hydration of raw material rice grains is performed by addition of a fixed amount of water instead of soaking in water in a soaking tank and there is no redundant water. Also, this manufacturing method gelatinizes the surface layer of rice grains in advance by a preparatory pressurized-steaming process to impart toughness. Accordingly, no crack is caused at the time of addition of the fixed amount of water, and the rice grains are not deformed in steps following the hydration step.

However, the instant rice obtained by the manufacturing method cannot be restored to edible rice simply by pouring hot water. To restore the instant rice to edible rice, it has to be boiled over a long time or has to be heated by microwave or the like.

LIST OF CITATIONS

Patent Documents

Patent document 1: Japanese Patent Laid-Open No. 2011-83196

SUMMARY OF INVENTION

Technical Problem

Accordingly, the present invention aims to provide a manufacturing method of instant rice which can be restored to edible rice simply by pouring hot water, instant rice obtained by the manufacturing method of instant rice, and a device used in the manufacturing method of instant rice.

Solution to Problem

To achieve the object described above, a manufacturing method of instant rice of the present invention includes a first pressurized-steaming step for steaming raw material rice under pressure while the raw material rice is being agitated, and forming a gelatinized layer on a surface of the raw material rice, a hydration step for hydrating the raw material rice having the gelatinized layer formed on the surface, a tempering step for making moisture content of the hydrated raw material rice uniform, a second pressurized-steaming step for steaming the hydrated raw material rice under pressure while the raw material rice is being agitated, and gelatinizing the raw material rice to a center, a dehydration step for dehydrating the raw material rice that is gelatinized to the center, and an expansion step for expanding the dehydrated raw material rice.

In the manufacturing method of instant rice of the present invention, it is preferable that, in the hydration step, the raw material rice is hydrated while being agitated, and in the tempering step, the moisture content of the raw material rice is made uniform while the raw material rice is being agitated.

In the manufacturing method of instant rice of the present invention, it is preferable that the first pressurized-steaming step, the hydration step, the tempering step, the second pressurized-steaming step, and the dehydration step are performed inside a drum while the raw material rice is being agitated, the method being performed using a device including the drum that is provided with a raw material hatch at a peripheral surface, and that is arranged in a manner capable of rotating around a horizontal axis, agitation means that is arranged inside the drum, the agitation means being for agitating, according to rotation of the drum, the raw material rice put into the drum from the raw material hatch, steam supply means for supplying steam into the drum, pressure adjustment means, including a valve for communicating inside of the drum with outside air, for enabling inside of the drum to be pressurized by steam supplied by the steam supply means, by closing the valve when the raw material rice is to be steamed under pressure, hydration means that is arranged inside the drum, the hydration means being for hydrating the raw material rice inside the drum, and dehydration means for dehydrating the raw material rice by reducing a pressure inside the drum.

In the manufacturing method of instant rice of the present invention, it is preferable that, in the first pressurized-steaming step, the raw material rice is steamed under pressure for two to five minutes in a pressurized state of 0.05 to 0.2 MPa, in the hydration step, the raw material rice is hydrated so that the moisture content of the raw material rice is 25 to 35%, in the tempering step, tempering of the raw material rice is performed for 20 to 30 minutes in an atmosphere of 50 to 80° C., in the second pressurized-steaming step, the raw material rice is steamed under pressure for five to ten minutes in a pressurized state of 0.1 to 0.2 MPa, and in the dehydration step, the raw material rice is dehydrated in a reduced pressure for 120 to 240 minutes in a reduced pressure state of −0.08 to −0.09 MPa so as to make the moisture content of the raw material rice 20 to 22%.

The manufacturing method of instant rice of the present invention preferably further includes a milling step for milling the dehydrated raw material rice, and a flaking step for flaking the milled raw material rice, where, in the expansion step, the flaked raw material rice is dehydrated and expanded at a temperature of 200 to 250° C. so as to make the moisture content of the raw material rice 6 to 8%.

To achieve the object described above, instant rice of the present invention is obtained by any one of the manufacturing methods described above.

Furthermore, to achieve the object described above, a device to be used in a manufacturing method of instant rice of the present invention is a device for performing the first pressurized-steaming step, the hydration step, the tempering step, the second pressurized-steaming step, and the dehydration step, the device including a drum that is provided with a raw material hatch at a peripheral surface, and that is arranged in a manner capable of rotating around a horizontal axis, agitation means that is arranged inside the drum, the agitation means being for agitating, according to rotation of the drum, raw material rice put into the drum from the raw material hatch, steam supply means for supplying steam into the drum, pressure adjustment means, including a valve for communicating inside of the drum with outside air, for enabling inside of the drum to be pressurized by steam supplied by the steam supply means, by closing the valve when the raw material rice is to be steamed under pressure, hydration means that is arranged inside the drum, the hydration means being for hydrating the raw material rice inside the drum, and dehydration means for dehydrating the raw material rice by reducing a pressure inside the drum.

In the device to be used in a manufacturing method of instant rice of the present invention, it is preferable that the hydration means is a hydration pipe that is arranged inside the drum, the dehydration means includes a vacuum pump that is communicable with inside of the drum, and in the first pressurized-steaming step, water is added by the hydration pipe to the raw material rice having a gelatinized layer formed on a surface, and in the second pressurized-steaming step, the raw material rice that is gelatinized to a center is dehydrated by reducing a pressure inside the drum by the vacuum pump.

In the device to be used in a manufacturing method of instant rice of the present invention, it is preferable that the steam supply means supplies steam into the drum through an opening that is formed at a center of a first end face of the drum, and the pressure adjustment means allows communication of inside of the drum with outside air through an opening that is formed at a center of a second end face of the drum.

In the device to be used in a manufacturing method of instant rice of the present invention, it is preferable that a screen that uniformly disperses, inside the drum, steam that is supplied from the steam supply means is arranged at a side of the first end face on an inner peripheral surface of the drum.

Advantageous Effects of Invention

With the manufacturing method of instant rice according to the present invention, raw material rice is steamed under pressure in the first pressurized-steaming step while being agitated. Accordingly, the raw material rice is not stuck together in this step, and a gelatinized layer is formed evenly on the entire surface of all of the raw material rice.

Also, with the manufacturing method of instant rice according to the present invention, the raw material rice is steamed under pressure in the second pressurized-steaming step while being agitated. Accordingly, the raw material rice is not stuck together in this step, and all of the raw material rice is evenly gelatinized to the center.

Accordingly, with the manufacturing method of instant rice of the present invention, all the raw material rice grains may be completely gelatinized, and instant rice which can be restored to edible rice simply by pouring hot water may be manufactured.

With the manufacturing method of instant rice according to the present invention, the raw material rice is hydrated while being agitated in the hydration step. Thus, the raw material rice is not stuck together in this step, and all the raw material rice evenly absorbs water from the entire surface.

Also, with the manufacturing method of instant rice according to the present invention, the raw material rice is agitated and the moisture content is made uniform in the tempering step. Thus, the moisture inside the raw material rice becomes even, and the moisture content is made uniform among the raw material rice.

Accordingly, with the manufacturing method of instant rice of the present invention, evenly high-quality instant rice which may be restored to edible rice simply by pouring hot water may be manufactured.

Furthermore, all of instant rice which is obtained by the manufacturing method of instant rice of the present invention is completely gelatinized. Accordingly, edible rice may be restored simply by pouring hot water.

According to the instant rice obtained by a manufacturing method of instant rice of the present invention, high-quality edible rice may be restored simply by pouring hot water.

Furthermore, a device to be used in the manufacturing method of instant rice of the present invention may perform the first pressurized-steaming step, the hydration step, the tempering step, the second pressurized-steaming step, and the dehydration step of the manufacturing method while agitating raw material rice inside a drum. Accordingly, all of the raw material rice may be completely gelatinized, and instant rice which may be restored to edible rice simply by pouring hot water may be manufactured.

The device to be used in the manufacturing method of instant rice of the present invention constantly agitates the raw material rice inside the drum by agitation means that is arranged inside the drum during the series of processes to be performed inside the drum. Thus, the series of processes may be evenly and uniformly performed on all the raw material rice inside the drum.

Accordingly, with the device to be used in the manufacturing method of instant rice of the present invention, evenly high-quality instant rice may be efficiently manufactured.

With the device to be used in the manufacturing method of instant rice of the present invention, raw material rice is made to absorb water by adding a small amount of water just enough to perform gelatinization to the raw material rice inside the drum by the hydration means that is arranged inside the drum. Thus, there is no need for a tank for a soaking process, and a drainage treatment facility therefor does not have to be provided.

Also, with the device to be used in the manufacturing method of instant rice of the present invention, a series of processes from water absorption by the raw material rice, steaming under pressure of the raw material rice after water absorption, to dehydration of the raw material rice which has been subjected to the pressurized-steaming process are performed inside the same drum. Accordingly, the production line may be simplified, and the facility cost may be greatly reduced.

The device to be used in the manufacturing method of instant rice of the present invention has heating means arranged inside the drum, and the inside of the drum is constantly heated by the heating means during the series of processes that are performed inside the drum. Accordingly, a state that allows the raw material to easily absorb water may be achieved, and water may be absorbed by the raw material in a short time, and also the raw material which has been subjected to the pressurized-steaming process may be dehydrated in a short time.

In the device to be used in the manufacturing method of instant rice of the present invention, the hydration means is a hydration pipe that is arranged inside the drum, and water is added by the hydration pipe to the raw material rice which has been subjected, inside the drum, to first pressurized-steaming for forming a gelatinized layer on the surface. Since the surface of the raw material rice is toughened by the gelatinized layer, even if the amount of water to be added is increased to accelerate the water absorption speed of the raw material rice, the surface of the raw material rice is not cracked.

Accordingly, with the device to be used in the manufacturing method of instant rice of the present invention, instant rice with high appearance quality may be efficiently manufactured.

Moreover, with the device to be used in the manufacturing method of instant rice according to the present invention, the raw material rice which has been subjected to the first pressurized-steaming in the drum is in a state where water is extremely easily absorbed due to the heat by the steaming. Accordingly, since hydration may be performed while the raw material rice is in a state where water is extremely easily absorbed due to the heating inside the drum, water absorption may be performed in an even shorter time. Also, the amount of water to be added may be controlled in such a way that there is no water discharge.

With the device to be used in the manufacturing method of instant rice of the present invention, the steam supply means supplies steam into the drum through an opening that is formed at a center of a first end face of the drum, and the pressure adjustment means allows communication of inside of the drum with outside air through an opening that is formed at a center of a second end face of the drum. Air inside the drum may thus be discharged from an end face positioned opposite from the end face where the steam is supplied. Also, the air inside the drum may be efficiently replaced by steam.

The device to be used in the manufacturing method of instant rice of the present invention has a screen for uniformly dispersing, inside the drum, steam that is supplied from the steam supply means, the screen being arranged at a side of the first end face on the inner peripheral surface of the drum. The steam is thus uniformly dispersed inside the drum through the screen, and the inside of the drum may be efficiently filled with the steam.

DETAILED DESCRIPTION

An embodiment of the present invention will be described with reference to the drawings.

Figure 1:
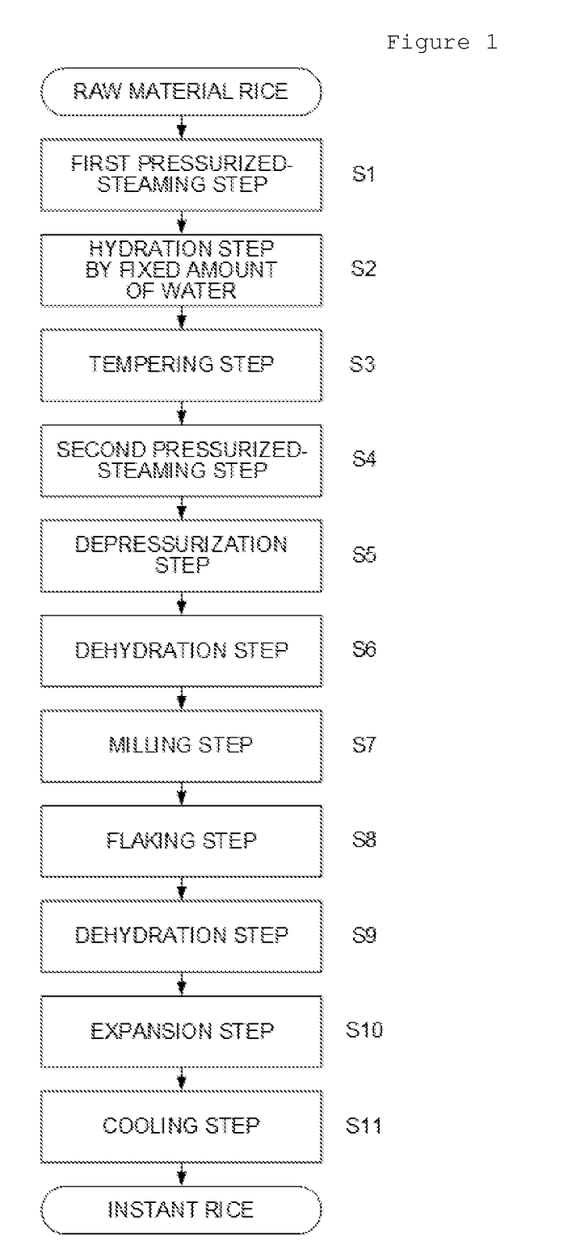
FIG. 1 shows a flow chart of manufacturing steps of instant rice according to an embodiment of the present invention.

FIG. 1 shows a flow chart of manufacturing steps of instant rice according to the embodiment of the present invention.

The instant rice of the present invention is manufactured by each step of a first pressurized-steaming step (S1), a hydration step (S2) by a fixed amount of water, a tempering step (S3), a second pressurized-steaming step (S4), a depressurization step (S5), a dehydration step (S6), a milling step (S7), a flaking step (S8), a dehydration step (S9), an expansion step (S10), and a cooling step (S11).

Figure 2:
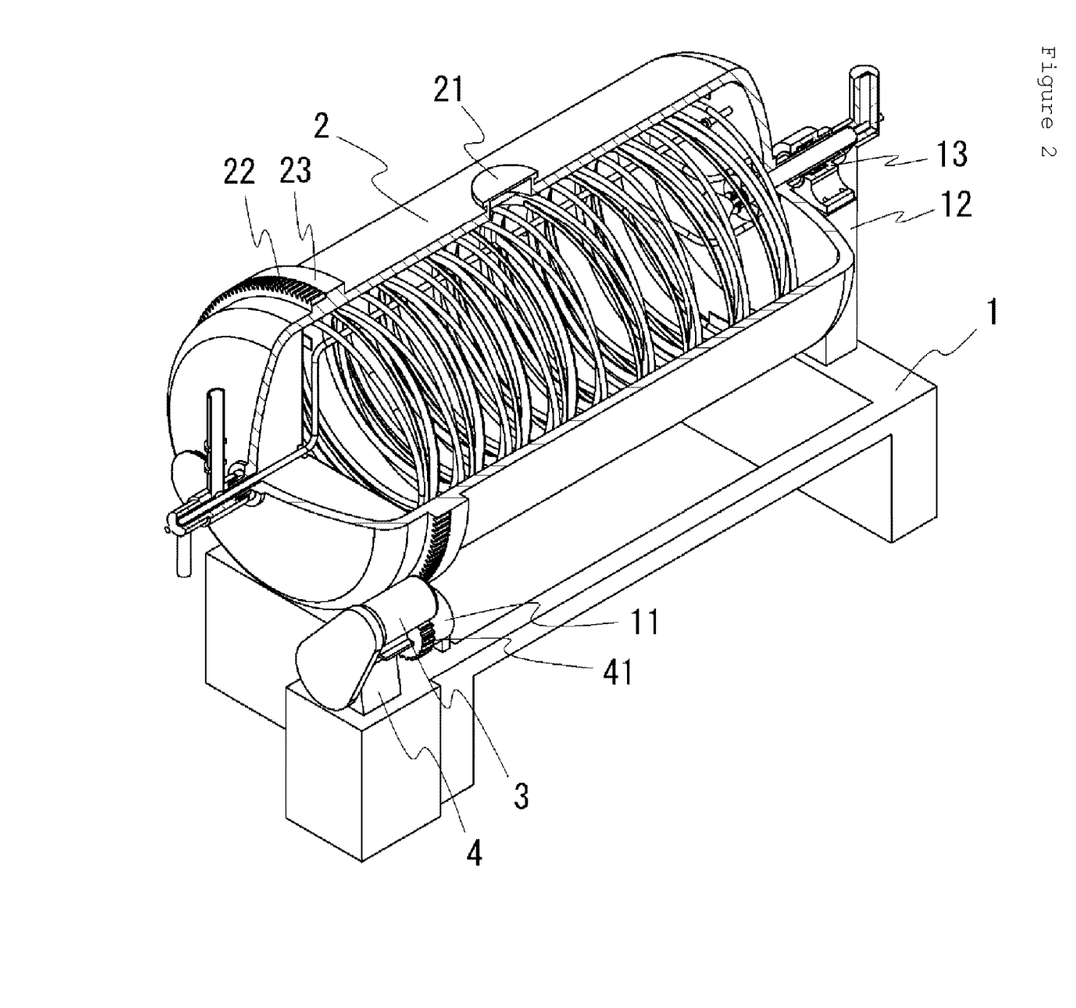
FIG. 2 is a cutaway perspective view of a device used in the manufacturing steps of instant rice according to the embodiment of the present invention.
Figure 3:
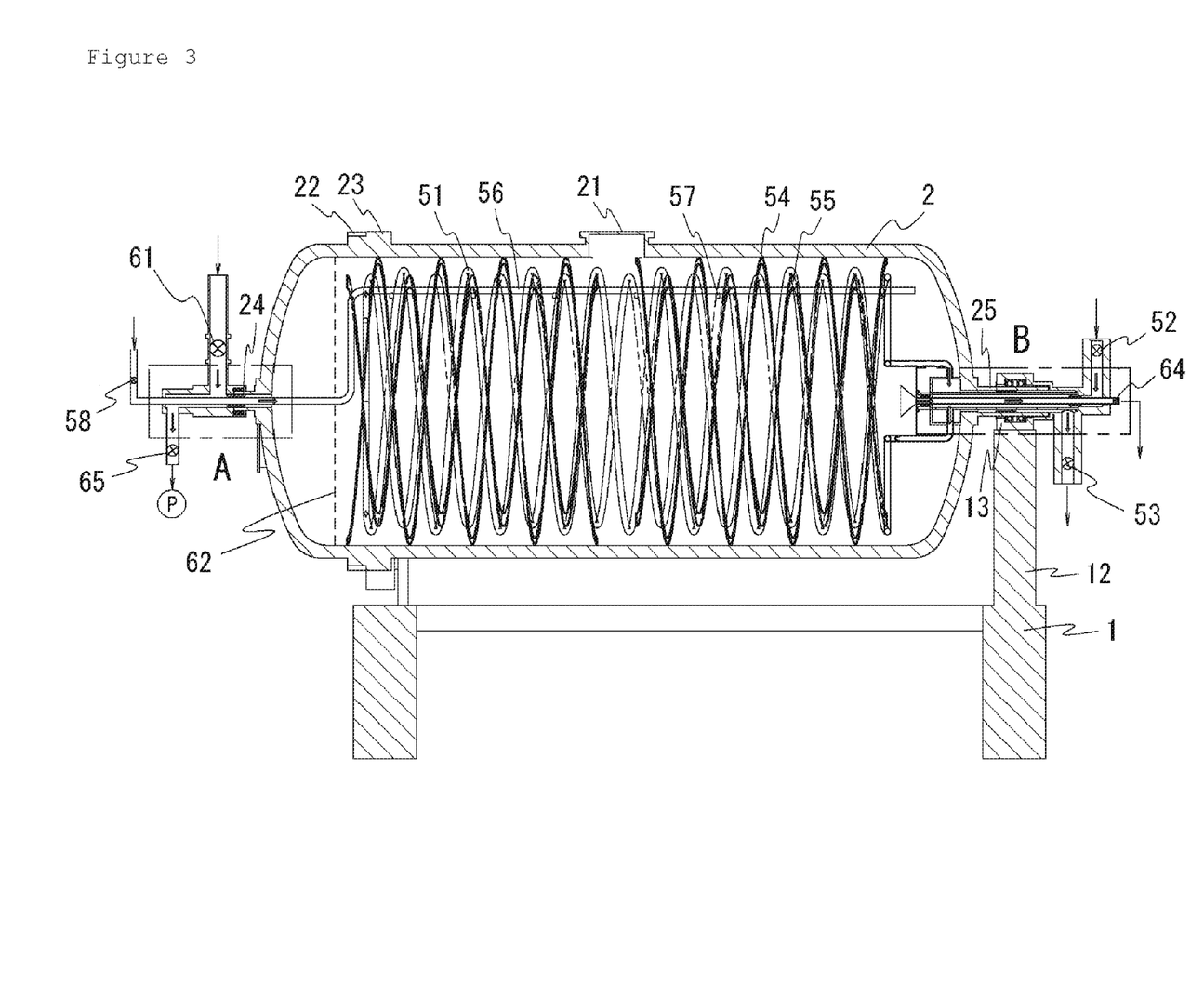
FIG. 3 is a cross-sectional view of the device used in the manufacturing steps of instant rice according to the embodiment of the present invention.

FIG. 2 is a cutaway perspective view of a device used in the manufacturing steps of instant rice according to the embodiment of the present invention. Also, FIG. 3 is a cross-sectional view of the device used in the manufacturing steps of instant rice according to the embodiment of the present invention.

The device used in the manufacturing steps of instant rice according to the embodiment of the present invention includes a cradle 1, a drum 2 that is placed sideways on the cradle 1 and that is supported in a manner capable of rotating around a horizontal axis, and a motor 3 for rotating the drum 2.

The motor 3, a reducer 4, and a pair of supporting rollers 11 are provided at one side of the upper surface of the cradle 1. A supporting pillar 12 is provided on the other side of the upper surface of the cradle 1. A drive gear 41 is provided on the output shaft of the reducer 4, and a driving force of the motor 3 is transmitted to the drive gear 41 through the reducer 4.

On the other hand, a raw material hatch 21 is provided on the peripheral surface of the drum 2, at a center portion in the axial direction. Also, a driven gear 22 that engages with the drive gear 41, and a protruding section 23 that is supported by the pair of supporting rollers 11 are formed on the side of one end face of the peripheral surface of the drum 2, around the entire periphery of the drum 2.

Furthermore, an opening is formed at the center of each end face of the drum 2. A first cylindrical section 24 extending to the outside is provided to one end face, and a second cylindrical section 25 extending to the outside is provided to the other end face. The inside and the outside of the drum 2 are communicated through the insides of the first cylindrical section 24 and the second cylindrical section 25.

The drum 2 has the protruding section 23 formed on the side of the one end face supported by the pair of supporting rollers 11. Moreover, the second cylindrical section 25 formed to the other end face is supported by a bearing 13 which is fixed on the supporting pillar 12. Then, the drum 2 is rotated by the driving force of the motor 3 which is transmitted from the drive gear 41 to the driven gear 22.

As shown in FIG. 3, a heating pipe 51 for heating the inside of the drum 2, agitator blades 54 and 55 for agitating raw material put into the drum 2 from the raw material hatch 21, and a hydration pipe 56 for hydrating the raw material inside the drum 2 are arranged inside the drum 2.

The heating pipe 51 is arranged across both end faces. Also, the heating pipe 51 is arranged in such a way that one pipe forms a double helix inside the drum 2. Moreover, the heating pipe 51 is arranged in such a way that it rotates integrally with the drum 2.

When a heating steam supply valve 52 and a heating steam outlet valve 53 are opened, heating steam is supplied to the heating pipe 51 from a heating steam supply source, not shown, outside the drum through the second cylindrical section 25. Then, the heating steam flows through the heating pipe 51 inside the drum 2. After heating the inside of the drum 2, the heating steam is discharged outside the drum through the second cylindrical section 25.

The agitator blades 54 and 55 are arranged facing each other across the center portion in the axial direction. Blade members forming forward and reverse helices inside the drum 2 transfer raw materials to the center portion in the axial direction. The agitator blades 54 and 55 are provided as two types of blade members having different diameters. The first agitator blade 54 is fixed to the inner peripheral surface of the drum 2, and the second agitator blade 55 is fixed to the heating pipe 51. The first agitator blade 54 and the second agitator blade 55 are thereby rotated integrally with the drum 2. By arranging two types of blade members (the first agitator blade 54 and the second agitator blade 55) as the agitator blades, the force for agitating and transferring the raw material may be increased.

The hydration pipe 56 is arranged inside the drum 2 in such a way that one straight pipe is arranged on the inside of the heating pipe 51. Also, the hydration pipe 56 is provided with a plurality of hydration nozzles 57. The hydration pipe 56 is arranged while being fixed so that it does not rotate together with the rotation of the drum 2.

When a water supply valve 58 is opened, water is supplied to the hydration pipe 56 from a water supply source, not shown, outside the drum, and the supplied water is supplied into the first cylindrical section 24 at the end face of the drum 2. Then, the water is added inside the drum 2 to the raw material from the plurality of hydration nozzles 57 provided to the hydration pipe 56. The water from the hydration nozzles 57 is added in the form of mist or shower.

When a steam supply valve 61 is opened, steam is supplied from a steam supply source, not shown, outside the drum into the drum 2 through the first cylindrical section 24.

A screen 62 may be arranged on the side of the one end face on the inner peripheral surface of the drum 2. This screen 62 uniformly disperses, inside the drum 2, the steam that is supplied from the steam supply source through the inside of the first cylindrical section 24. If a mesh finer than the particle diameter of the raw material is arranged as the screen 62, the raw material may be prevented from accumulating at an end on one side of the drum 2.

Also, a safety valve, not shown, is provided to the drum 2, at a position, on the side of the one end face, closer to the end face than the screen 62. In the case where the pressure inside the drum 2 exceeds a set value determined as abnormal, the pressure inside the drum 2 may be automatically reduced to a value at or below a predetermined set value by the steam inside the drum 2 being discharged through the safety valve.

The inside of the drum 2 may be made to communicate with the outside air through the second cylindrical section 25 by opening of a drum open valve 64 which is provided to an outside air communicating pipe 63 described later.

If the drum open valve 64 is kept open at the time of steam being supplied into the drum 2 from the steam supply source, air inside the drum 2 may be discharged from the other end face positioned on the opposite side from the side where the steam is supplied. Air inside the drum 2 may thereby be efficiently replaced by steam.

Also, by closing the drum open valve 64 at the time of steam being supplied into the drum 2, the inside of the drum 2 may be placed in a pressurized state.

The inside of the drum 2 may be made to communicate with a vacuum pump outside the drum through the first cylindrical section 24 by opening of a suction valve 65.

By reducing the pressure inside of the drum 2 by using the vacuum pump, the raw material inside the drum 2 may be dehydrated.

Figure 4:
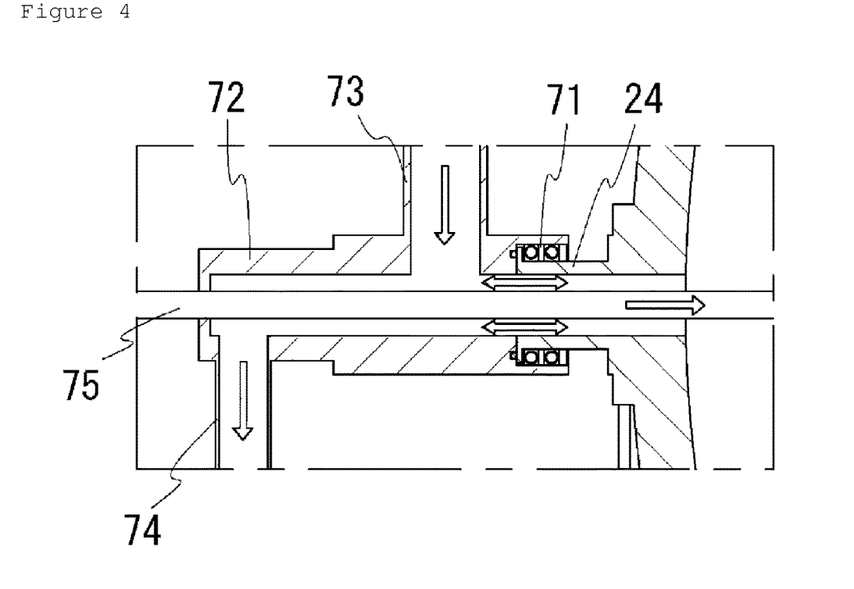
FIG. 4 is an enlarged view of part A in FIG. 3.
Figure 5:
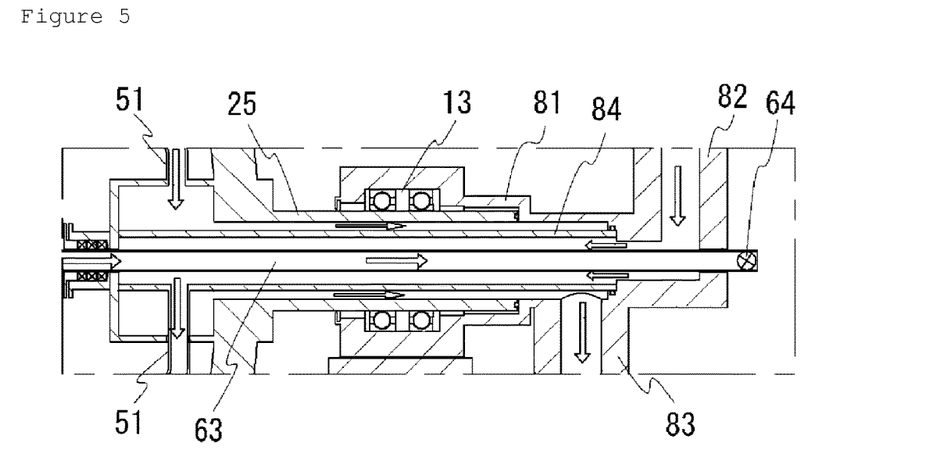
FIG. 5 is an enlarged view of part B in FIG. 3.

Now, FIG. 4 shows an enlarged view of part A in FIG. 3. Also, FIG. 5 shows an enlarged view of part B in FIG. 3.

As shown in FIG. 4, first piping 72 is connected to the first cylindrical section 24 via a bearing 71 in a manner capable of relatively rotating.

A steam supply pipe 73 communicating with the steam supply source, and a suction pipe 74 communicating with the vacuum pump are connected to the first piping 72. Here, the first piping 72, the steam supply pipe 73, and the suction pipe 74 may be formed integrally or separately.

Also, hydration piping 75 is arranged at a center portion of the first piping 72 through the inside of the first cylindrical section 24. Water is supplied from the water supply source to the hydration pipe 56 through the hydration piping 75. The hydration piping 75 is arranged in such a manner that it does not rotate integrally with the drum 2.

Moreover, a channel is formed between respective inner peripheral surfaces of the first piping 72 and the first cylindrical section 24 and an outer peripheral surface of the hydration piping 75. This channel communicates the steam supply pipe 73 and the suction pipe 74 with the inside of the drum 2.

On the other hand, as shown in FIG. 5, second piping 81 is connected to the second cylindrical section 25 via the bearing 13 in a manner capable of relatively rotating.

A heating steam supply pipe 82 communicating with the heating steam supply source, and a heating steam outlet pipe 83 for discharging the heating steam from the heating pipe 51 are connected to the second piping 81. Here, the second piping 81, the heating steam supply pipe 82, and the heating steam outlet pipe 83 may be formed integrally or separately.

Also, a cylindrical wall 84 is arranged inside the second cylindrical section 25. The cylindrical wall 84 integrally rotates with the drum 2.

Furthermore, as described above, the outside air communicating pipe 63 that enables the inside of the drum 2 to communicate with outside air by opening of the drum open valve 64 is arranged inside the cylindrical wall 84. The outside air communicating pipe is arranged in such a manner that it does not rotate together with the drum 2.

Moreover, a channel is formed between an inner peripheral surface of the cylindrical wall 84 and an outer peripheral surface of the outside air communicating pipe 63. This channel communicates the heating steam supply pipe 82 and the heating pipe 51. Also, a channel is formed between respective inner peripheral surfaces of the second cylindrical section 25 and the second piping 81 and an outer peripheral surface of the cylindrical wall 84. This channel communicates the heating pipe 51 and the heating steam outlet pipe 83.

Next, a method for manufacturing instant rice by manufacturing steps according to the embodiment of the present invention will be described.

In the embodiment of the present invention, a series of steps from the first pressurized-steaming step (S1) to the dehydration step (S6) in the manufacturing steps are performed by the device shown in FIGS. 2 to 5.

Additionally, here, brown rice or partially-milled rice (rice milled with bran only partially removed; the same applies below) is used as raw material rice.

First, the heating steam supply valve 52 and the heating steam outlet valve 53 are opened, and heating steam is supplied from the heating steam supply source, not shown, to the heating pipe 51. Then, the heating steam flows inside the heating pipe 51 and heats the inside of the drum 2.

Next, raw material rice is put into the heated drum 2 from the raw material hatch 21 facing upward, and agitation of the raw material rice by the agitator blades 54 and 55 is started by rotation of the drum 2. The heating of the inside of the drum 2 and the agitation of the raw material rice by the rotation of the drum 2 are continuously performed until the end of the dehydration step (S6).

(S1) First Pressurized-Steaming Step

The steam supply valve 61 is opened, and steam is continuously supplied from the steam supply source. At this time, the suction valve 65 is closed, and the drum open valve 64, which is positioned at the end face opposite from the side where the steam is supplied, is opened. The air inside the drum 2 is pushed out from the drum open valve 64 by the steam, and the air inside the drum 2 is efficiently replaced by the steam.

When the air inside the drum 2 is replaced by the steam, the drum open valve 64 is closed while maintaining supply of steam into the drum 2. Then, the inside of the drum 2 is pressurized by the steam until it reaches a predetermined pressure of 0.05 to 0.2 MPa.

Then, the degree of opening of the steam supply valve 61 is controlled for two to five minutes until only the surface portion of the starch of the raw material rice is gelatinized after the inside of the drum 2 has reached the predetermined pressure. The pressurized-steaming process is thus performed on the raw material rice while a constant pressure is maintained inside the drum 2.

At this time, the drum 2 is kept rotating, and the raw material rice is agitated inside the drum 2. Accordingly, the raw material rice is not stuck together, and a gelatinized layer is evenly formed on the entire surface of all of the raw material rice.

After the predetermined time has elapsed, the steam supply valve 61 is closed, and the drum open valve 64 is opened. Then, the inside of the drum 2 is depressurized to 0 MPa, that is, the atmospheric pressure.

(S2) Hydration Step by a Fixed Amount of Water

The drum open valve 64 is closed and the water supply valve 58 is opened, and water is supplied to the hydration pipe 56 from the water supply source, not shown. Hydration is performed in the form of mist or shower from the plurality of hydration nozzles 57 provided to the hydration pipe 56. Hydration is performed so that the moisture content of the raw material rice is predetermined moisture content of 25 to 35%, or preferably, 25 to 32%, at a pace that does not cause redundant water inside the drum 2. At this time, the pressure inside the drum 2 is maintained at 0 MPa.

At this time, since the inside of the drum 2 is heated by the heating pipe 51, the raw material rice absorbs water in a short time. Also, since the drum 2 is kept rotating, and the raw material rice is agitated inside the drum 2, the raw material rice is not stuck together, and all the raw material rice evenly absorbs water from the entire surface.

After being subjected to the first pressurized-steaming step, the raw material rice has a uniform gelatinized layer evenly formed on the entire surface, and the surface portion is toughened. Accordingly, even if the amount of water is increased to accelerate the water absorption speed of the raw material rice, the raw material rice is not cracked at the surface.

Also, after being subjected to the first pressurized-steaming step, the material is in a state where water is extremely easily absorbed due to heat. Since hydration is performed in this state while maintaining the state where water is extremely easily absorbed by the raw material rice by heating of the inside of the drum 2, water may be absorbed in an even shorter time. Also, the amount of water addition may be controlled so that there is no water discharge.

(S3) Tempering Step

The water supply valve 58 is closed, and tempering is performed for 20 to 30 minutes in the atmosphere of 50 to 80° C. The pressure inside the drum 2 is maintained at 0 MPa at this time. Also, the moisture content of the raw material rice is maintained at 25 to 35%.

At this time, the drum 2 is kept rotating, and the raw material rice is agitated inside the drum 2. Accordingly, the moisture in each raw material rice grain becomes even, and the moisture content of the raw material rice grains may be made uniform.

Also, in the present step, since tempering is performed with enough time, functional ingredients such as minerals may be enriched.

(S4) Second Pressurized-Steaming Step

The steam supply valve 61 is opened, and steam is supplied again from the steam supply source. At this time, the suction valve 65 is kept in a closed state, and the drum open valve 64 is opened. The air inside the drum 2 is thus pushed out from the drum open valve 64 by the steam, and the air inside the drum 2 is efficiently replaced by the steam.

When the air inside the drum 2 is replaced by the steam, the drum open valve 64 is closed while maintaining supply of steam into the drum 2. Then, the inside of the drum 2 is pressurized by the steam until it reaches a predetermined pressure of 0.1 to 0.2 MPa.

Then, the degree of opening of the steam supply valve 61 is controlled for five to ten minutes after the inside of the drum 2 has reached the predetermined pressure. The starch of the raw material is thereby gelatinized to the center. Then, the pressurized-steaming process is performed on the raw material rice while a constant pressure is maintained inside the drum 2.

At this time, the drum 2 is kept rotating, and the raw material rice is agitated inside the drum 2. Accordingly, the raw material rice is not stuck together in this step, and all the raw material rice is evenly gelatinized to the center.

(S5) Depressurization Step

After the predetermined time has elapsed, the steam supply valve 61 is closed, and the drum open valve 64 is opened. Then, the inside of the drum 2 is depressurized to 0 MPa, that is, the atmospheric pressure. At this time, the heat of the surface of the raw material rice is removed according to the discharge of the steam.

(S6) Dehydration Step

The drum open valve 64 is closed and the suction valve 65 is opened, and the vacuum pump is operated to reduce the pressure inside of the drum 2. At this time, by maintaining the inside of the drum 2 in a negative pressure state of −0.08 to −0.09 MPa for 120 to 240 minutes, the raw material rice inside the drum 2 may be efficiently dehydrated.

At this time, the drum 2 is kept rotating, and the raw material rice is agitated inside the drum 2. Accordingly, the raw material rice is not stuck together, and all of the raw material rice is uniformly dehydrated.

Also, the inside of the drum 2 is heated by the heating pipe 51, and the dehydration is completed in a short time.

After the dehydration is completed, the raw material hatch 21 is turned upward, and the rotation of the drum 2 is stopped. Then, the heating steam supply valve 52 and the heating steam outlet valve 53 are closed, and supply of heating steam from the heating steam supply source to the heating pipe 51 is stopped. Also, the operation of the vacuum pump is stopped, and the suction valve 65 is closed. Moreover, the drum open valve 64 is opened, and the pressure inside the drum 2 is returned to the atmospheric pressure.

Then, the door of the raw material hatch 21 which is turned upward is opened, and the raw material inside the drum 2 is discharged while rotating the drum 2. At this time, the moisture content of the discharged raw material rice is 20 to 22% due to the dehydration process.

Here, during the series of processes, the raw material rice is moved to the center due to the action of the agitator blades by the rotation of the drum 2. Accordingly, the raw material rice may be easily discharged outside the drum 2.

(S7) Milling Step

Next, the raw material rice discharged from the drum 2 is milled by using a known vertical grinding-type rice milling machine or the like to obtain white rice. Since the raw material rice discharged from the drum 2 is highly elastic due to high moisture content, even when it is milled (wet milling), fracture is not easily caused, and the yield is increased.

(S8) Flaking Step

A flaking process is performed by using a known flaking machine, by passing the white rice through a pair of rolls with a roll gap of 0.25 to 0.4 mm. The bond between the cells of the raw material rice may be weakened by this flaking process, and expansion described below may be facilitated.

(S9) Dehydration Step

The raw material rice which has been subjected to the flaking process is dehydrated by hot air by using a known dehydrator, and the moisture content of the raw material rice is adjusted to 12 to 16%.

(S10) Expansion Step

An expansion process is performed by using a known device such as an "expansion dehydration processing device" described in Patent document 1 with the inner temperature being 200 to 250° C. to achieve moisture content of the raw material rice of 6 to 8%. The raw material rice is expanded and a void is formed inside by this expansion process, thereby increasing the water absorbability, and instant rice that can be restored in a short time by hot water can be obtained.

(S11) Cooling Step

The raw material rice which has been subjected to the expansion process is cooled by wind at a normal temperature. The cooled raw material rice is made into a product through processes such as packing.

In the present embodiment described above, the series of steps from the first pressurized-steaming step (S1) to the dehydration step (S6) in the manufacturing steps shown in FIG. 1 are performed by using the device shown in FIGS. 2 to 5. For example, each step described above may be performed by a combination of a plurality of devices, as described in Patent document 1. However, in the present invention, at least the first pressurized-steaming step (S1) and the second pressurized-steaming step (S4), or more preferably, from the first pressurized-steaming step (S1) to the second pressurized-steaming step (S4), have to be performed while agitating the raw material rice.

Also, in the embodiment of the present invention described above, brown rice or partially-milled rice is used as the raw material rice, but white rice may alternatively be used, and in this case, the milling step (S7) may be omitted.

Additionally, according to the device that is used in the manufacturing steps of the instant rice according to the embodiment of the present invention, the heating pipe 51 is arranged in such a manner as to integrally rotate with the drum 2, but the heating pipe 51 may be arranged in such a manner that it does not rotate together with the drum 2.

According to the device that is used in the manufacturing steps of the instant rice according to the embodiment of the present invention, the inside of the drum 2 is heated by steam being supplied to the heating pipe 51, but the inside of the drum 2 may alternatively be heated by hot water being supplied to the heating pipe 51. Also, the inside of the drum may be heated by a heater instead of the heating pipe 51.

According to the device that is used in the manufacturing steps of the instant rice according to the embodiment of the present invention, two types of blade members with different diameters are provided as the agitator blades 54 and 55, but it is also possible to provide only one type of blade member instead.

It is needless to say that the present invention is not limited to the embodiment described above, and that changes may be made as appropriate within the scope of the invention.

INDUSTRIAL APPLICABILITY

The present invention provides a manufacturing method of instant rice which can be restored to edible rice simply by pouring hot water, instant rice which is obtained by the manufacturing method, and a device to be used in the manufacturing method, and is extremely useful.

REFERENCE SIGNS LIST

1 Cradle
2 Drum
3 Motor
4 Reducer
11 Supporting roller
12 Supporting pillar
13 Bearing
21 Raw material hatch
22 Driven gear
23 Protruding section
24 First cylindrical section
25 Second cylindrical section
41 Drive gear
51 Heating pipe
52 Heating steam supply valve
53 Heating steam outlet valve
54, 55 Agitator blade
56 Hydration pipe
57 Hydration nozzle
58 Water supply valve
61 Steam supply valve
62 Screen
63 Outside air communicating pipe
64 Drum open valve
65 Suction valve
71 Bearing
72 First piping
73 Steam supply pipe
74 Suction pipe
75 Hydration piping
81 Second piping
82 Heating steam supply pipe
83 Heating steam outlet pipe
84 Cylindrical wall

What is claimed is:

1. A manufacturing method of instant rice, the method comprising:
    a first pressurized-steaming step for steaming raw material rice under pressure while the raw material rice is being agitated, and forming a gelatinized layer on a surface of the raw material rice;
    a hydration step for hydrating the raw material rice having the gelatinized layer formed on the surface;
    a tempering step for making moisture content of the hydrated raw material rice uniform;
    a second pressurized-steaming step for steaming the hydrated raw material rice under pressure while the raw material rice is being agitated, and gelatinizing the raw material rice to a center;

a dehydration step for dehydrating the raw material rice that is gelatinized to the center; and an expansion step for expanding the dehydrated raw material rice, wherein the first pressurized-steaming step, the hydration step, the tempering step, the second pressurized-steaming step, and the dehydration step are performed inside a drum while the raw material rice is being agitated, the method being performed using a device including the drum, which is provided with a raw material hatch at a peripheral surface, and that is arranged in a manner capable of rotating around a horizontal axis, agitation means arranged inside the drum, the agitation means being for agitating, according to rotation of the drum, the raw material rice put into the drum from the raw material hatch, steam supply means for supplying steam into the drum, pressure adjustment means, including a valve for communicating inside of the drum with outside air, for enabling inside of the drum to be pressurized by steam supplied by the steam supply means, by closing the valve when the raw material rice is to be steamed under pressure, hydration means that is arranged inside the drum, the hydration means being for hydrating the raw material rice inside the drum, and dehydration means for dehydrating the raw material rice by reducing a pressure inside the drum.

2. The manufacturing method of instant rice according to claim 1, wherein, in the hydration step, the raw material rice is hydrated while being agitated, and wherein, in the tempering step, the moisture content of the raw material rice is made uniform while the raw material rice is being agitated.

3. The manufacturing method of instant rice according to claim 1, the method further comprising:

a milling step for milling the dehydrated raw material rice; and a flaking step for flaking the milled raw material rice, wherein, in the expansion step, the flaked raw material rice is dehydrated and expanded at a temperature of 200 to 250° C. so as to make the moisture content of the raw material rice 6 to 8%.

4. Instant rice, wherein the instant rice is obtained by the method according to claim 1.

5. A manufacturing method of instant rice, the method comprising:

a first pressurized-steaming step for steaming raw material rice under pressure while the raw material rice is being agitated, and forming a gelatinized layer on a surface of the raw material rice;

a hydration step for hydrating the raw material rice having the gelatinized layer formed on the surface;

a tempering step for making moisture content of the hydrated raw material rice uniform;

a second pressurized-steaming step for steaming the hydrated raw material rice under pressure while the raw material rice is being agitated, and gelatinizing the raw material rice to a center;

a dehydration step for dehydrating the raw material rice that is gelatinized to the center; and an expansion step for expanding the dehydrated raw material rice wherein the first pressurized-steaming step, the hydration step, the tempering step, the second pressurized-steaming step, and the dehydration step are performed inside a drum while the raw material rice is being agitated, the method being performed using a device including the drum, which is provided with a raw material hatch at a peripheral surface, and that is arranged in a manner capable of rotating around a horizontal axis, agitation means arranged inside the drum, the agitation means being for agitating, according to rotation of the drum, the raw material rice put into the drum from the raw material hatch, steam supply means for supplying steam into the drum, pressure adjustment means, including a valve for communicating inside of the drum with outside air, for enabling inside of the drum to be pressurized by steam supplied by the steam supply means, by closing the valve when the raw material rice is to be steamed under pressure, hydration means that is arranged inside the drum, the hydration means being for hydrating the raw material rice inside the drum, and dehydration means for dehydrating the raw material rice by reducing a pressure inside the drum, wherein, in the first pressurized-steaming step, the raw material rice is steamed under pressure for two to five minutes in a pressurized state of 0.05 to 0.2 MPa, wherein, in the hydration step, the raw material rice is hydrated so that the moisture content of the raw material rice is 25 to 35%, wherein, in the tempering step, tempering of the raw material rice is performed for 20 to 30 minutes in an atmosphere of 50 to 80° C., wherein, in the second pressurized-steaming step, the raw material rice is steamed under pressure for five to ten minutes in a pressurized state of 0.1 to 0.2 MPa, and wherein, in the dehydration step, the raw material rice is dehydrated for 120 to 240 minutes in a reduced pressure state of −0.08 to −0.09 MPa so as to make the moisture content of the raw material rice 20 to 22%.

6. Instant rice produced by the method of claim 5.

* * * * *